United States Patent
Baur

(10) Patent No.: US 6,387,264 B1
(45) Date of Patent: May 14, 2002

(54) UNIFIED FERMENTATION AND THICKENING PROCESS

(75) Inventor: Robert James Baur, Lake Oswego, OR (US)

(73) Assignees: CleanWater Services, Hillsboro, OR (US); HDR Engineering, Inc., Omaha, NE (US)

( * ) Notice: Subject to any disclaimer, the term of this patent is extended or adjusted under 35 U.S.C. 154(b) by 6 days.

(21) Appl. No.: 09/731,069

(22) Filed: Dec. 5, 2000

(51) Int. Cl.[7] .................................................. C02F 3/28
(52) U.S. Cl. ........................ 210/601; 210/608; 210/903; 210/908
(58) Field of Search .................................. 210/601, 607, 210/608, 629, 903, 906

(56) References Cited

U.S. PATENT DOCUMENTS

| | | | |
|---|---|---|---|
| 5,342,522 A | 8/1994 | Marsman et al. | 210/605 |
| 5,376,275 A | 12/1994 | Raper | 210/605 |
| 5,393,427 A * | 2/1995 | Barnard | |
| 5,514,277 A | 5/1996 | Khudenko | 210/603 |
| 5,601,719 A * | 2/1997 | Hawkins et al. | |
| 5,798,043 A | 8/1998 | Khudenko | 210/603 |
| 5,846,424 A | 12/1998 | Khudenko | 210/603 |
| 5,853,588 A | 12/1998 | Molof et al. | 210/605 |
| 5,853,589 A | 12/1998 | Desjardins | 210/605 |
| 6,039,873 A | 3/2000 | Stahler | 210/605 |
| 6,054,044 A | 4/2000 | Hoffland et al. | 210/96.1 |
| 6,077,430 A | 6/2000 | Chudoba et al. | 210/605 |
| 6,086,765 A * | 7/2000 | Edwards | |

FOREIGN PATENT DOCUMENTS

JP    11-156387   *   6/1999

OTHER PUBLICATIONS

"Prefermentation Technology for BNR Plants" by Munch, Elisabeth V.; The Activated Sludge Pages: Issue 1., p. No. 9, Prefermentation Technology; Available at: http://scitrav-.com/wwater/asp1/preferm.htm.

* cited by examiner

Primary Examiner—David A. Simmons
Assistant Examiner—Fred Prince
(74) Attorney, Agent, or Firm—Timothy E. Siegel

(57) ABSTRACT

A method for treating wastewater that generates a supernatant having a concentration of volatile fatty acids (VFAs) that falls within a specified range and a sludge that has percent total solids. The method includes the steps of providing a fermentation tank and a gravity thickener, operatively connected to the fermentation tank. The wastewater is permitted to flow continually or intermittently into the fermentation tank and a portion of the wastewater overflows the fermentation tank, thereby defining an overflow rate. The fermentation tank is subjected to anaerobic conditions and the wastewater in the tank is permitted to stratify so that sludge forms at the bottom of the tank. In addition the sludge is continually pumped from the bottom of the fermentation tank so that each stratification level within the fermentation tank corresponds to a sludge residence time that in turn corresponds to a range of VFA concentrations. The overflow from the fermentation tank is combined with the sludge from the fermentation tank in the gravity thickener, permitting VFAs to be separated from the sludge and mixed into the overflow to form a supernatant rich in VFAs. The sludge is conditioned by elutriation to improve settling characteristics. The rate of the pumping of the sludge from the bottom of the gravity thickener tank to a proportion of the overflow rate, the proportion being set such that the sludge has the specified percent total solids independent of VFA production.

4 Claims, 1 Drawing Sheet

UNIFIED FERMENTATION AND THICKENING PROCESS

BACKGROUND OF THE INVENTION

Wastewater treatment plants are continually researching ways to make discharged, treated sewage water safer for the environment. Over the past few decades there has been an increased concern with respect to the levels of biological nutrients, primarily phosphorous, in the treated wastewater that is discharged into the environment. As a result, many governmental bodies have introduced stricter regulations for the permissible phosphorous level in treated wastewater. In some cases these regulations have presented a challenge to treatment plant managers. As the trend toward stricter regulations continues, this challenge is likely to become increasingly widespread.

Phosphorous is introduced into the water system mainly via human waste, synthetic detergents and fertilizers. High levels of biological phosphorous in discharged wastewater can lead to eutrophication in local waters, which may cause changes in fauna speciation and fish kills.

The treatment of sewage is largely a biochemical operation where living microorganisms, principally bacteria, carry out chemical transformations of the sewage. Different environments favor the growth of varying populations of microorganisms and this in turn affects the efficiency, end products, and completeness of wastewater treatment.

In many waste water treatment facilities nutrients, including phosphorous, are removed by way of the action of a specific type of bacteria, which requires volatile fatty acids (VFAs) for use as an energy source.

Traditionally, primary sludge from the first stage of wastewater treatment (the primary clarifier) has been fermented to create VFAs for later use in biological nutrient removal processes like the Enhanced Biological Phosphorous Removal (EBPR) or the de-nitrification process. The fundamental biological processes of fermentation are the same as those of the first stage of anaerobic digestion, which is composed of two phases, hydrolysis and acetogenesis. The products of hydrolysis are soluble organic acids, which contain carbon. Acetogenesis converts those acids to volatile fatty acids (VFAs). VFAs are converted to methane by methanogenic bacteria in the second stage of anaerobic digestion. If diverted to a biological nutrient removal process the VFAs provide the energy source for the Enhanced Biological Phosphorous Removal process and a carbon source for de-nitrification.

With currently available technology, it is difficult to produce a liquid stream that has a wide range of VFA concentrations to meet the varying demands of the biological nutrient removal processes, and sludge that has a high percent total solids concentration and with good mechanical properties that permits easy pumping. There are several variations of fermentation methods that are currently used. The most basic is to allow primary sludge to stratify in a tank. VFAs are produced in the liquid and sludge fractions, but only the VFAs in the liquid portion are available to be pumped to the biological nutrient removal process. The high concentrations of VFAs in the sludge are sent to the solids handling processes and are not available for nutrient removal. If the amount of VFAs needed is reduced by seasonal or wastewater changes and the Sludge Residence Time (SRT) of the fermenter is reduced to reduce VFA production the sludge will not have enough SRT to thicken. The reduction in thickening will produce a less concentrated sludge with a lower percent total solids. A lower percent total solids sludge will increase solids handling and disposal costs. In an attempt to extract and recover the high concentrations of VFAs in the sludge, the 'activated' primary process subjects the sludge to anaerobic conditions to begin the production of organic acids via fermentation. A portion of this 'activated' sludge is then recycled back to the input line where it is mixed with incoming primary sludge. During this mixing process the primary sludge is inoculated with actively fermenting organisms for further organic acid production and elutriation of VFAs. One variation of fermentation, referred to as the "complete mix" method, is to force mixing in the fermentation tank before the sludge is separated by gravity. Extra stages allowing for further fermentation before recycling are sometimes added to this process.

One disadvantage of recycling activated anaerobic sludge is that over time biological growth may cause the sludge to become so viscous that it cannot be easily transported through the plant's pipelines. The sludge also never becomes well settled and therefore does not allow for optimal disposal, increasing costs to the wastewater plant. Another disadvantage of activated fermented sludge recycling is that as the sludge recycles over and over it gets older and bacteria that consume VFAs to produce methane increase in population.

Current treatment methods may not be able to satisfy the increasingly strict environmental regulations governing the allowed amount of phosphorus in treated wastewater. Satisfying these regulations becomes particularly difficult when the wastewater itself does not contain sufficient easily degradable organic matter to generate VFAs in a quantity large enough to achieve the newly desired level of biological nutrient removal. Some conditions that may allow this problem to occur are: a 'weak' influent, such as may occur during heavy rainfalls; low operating temperatures, such as during winter months or in colder geographical zones; or, short residence times in the pipes leading to the treatment plant.

The amount of VFAs needed for biological phosphorous removal production varies throughout the year depending on individual plant conditions. Excess VFAs can cause operational problems such as filament growth, bulking sludge and an increase in aeration requirements. A deficiency in VFAs also causes problems for the plant.

For some plants, in order to comply with increasingly stringent regulations, efficiency of the removal of phosphorous must be increased. When VFA production is insufficient, the plant must enhance the biological removal of phosphorous. This can be done by the addition of supplemental carbon sources such as acetic acid. Phosphorous removal can also be done chemically with the use of metal salts such as aluminum salts or iron salts. Metal salts primarily functions as a coagulant that aids in the removal of particulate material. Metal salts also promote the removal of phosphorous by facilitating chemical precipitation, which settles with the sludge and is removed along with the sludge.

This alternative may not only be expensive, but it also produces a chemical sludge that tends to be 'fluffy,' thereby increasing overall sludge volume. A higher volume makes it harder to remove water from the sludge, which also makes the sludge harder to dispose of, thereby increasing disposal costs.

Other drawbacks of this alternative include the need for extra storage space for the chemicals. Chemicals used in this process, such as Alum, tend to be highly corrosive. Having such chemicals on site at the wastewater treatment facility increases safety concerns and liability for the plant.

What is needed, but is not yet available, is a method of fermentation that consistently produces a desired concentration of volatile fatty acids to meet the varying demands of biological nutrient removal and efficient thickening of sludge while allowing for economical construction and operating costs of the wastewater treatment plant.

SUMMARY

The present invention is a method for treating wastewater that generates a supernatant having a concentration of volatile fatty acids (VFAs) that falls within a specified range and a sludge that has specified percent total solids independent of VFA production. The method includes the steps of providing a fermentation tank and a gravity thickener, operatively connected to the fermentation tank. The primary sludge is permitted to flow continually or intermittently into the fermentation tank and the liquid portion of the wastewater overflows the fermentation tank, thereby defining an overflow rate. The fermentation tank is subjected to anaerobic conditions and the wastewater in the tank is permitted to stratify so that sludge forms at the bottom of the tank. In addition the sludge is continually pumped from the bottom of the fermentation tank so that each stratification level within the fermentation tank corresponds to a sludge residence time that in turn corresponds to a range of VFA concentrations. The overflow from the fermentation tank is combined with the sludge from the fermentation tank in second tank acting as a gravity thickener, permitting VFAs to be separated from the sludge and mixed into the overflow to form a supernatant rich in VFAs. The sludge is conditioned by elutriation to improve its settling characteristics. The rate of the pumping of the sludge from the bottom of the thickener tank being set such that the sludge has the specified percent total solids desired. VFA production may be increased or decreased by varying the SRT in the fermenter while thickening can be controlled independently in the gravity thickener to optimize sludge thickening independently of VFA production.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
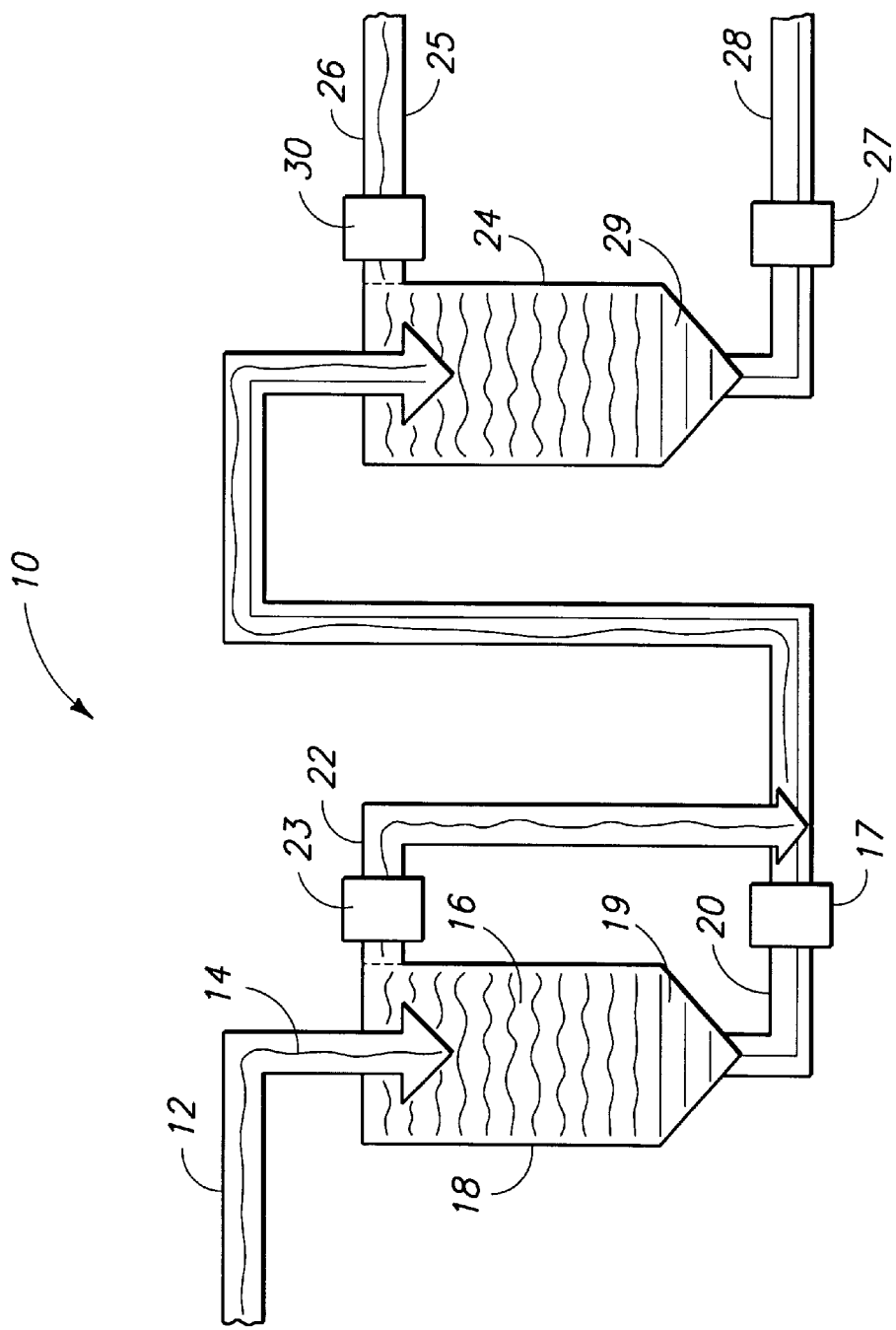
FIG. 1 is a schematic representation of a sewage treatment line adapted to perform the method of the present invention.

FIG. 1 is a schematic representation of a wastewater treatment line 10 adapted to perform the method of the present invention. The principle purpose of line 10 is to provide a mechanism that will generate a wide range of concentrations of volatile fatty organic acids, thereby increasing the efficiency of the biological nutrient removal process. Size of the tanks used in sewage treatment line 10 is selected in order to provide an appropriate fermentation time at the expected rates of input flow for a particular plant configuration.

Preceding Line 10 is the primary clarification process (not shown). During primary clarification fats, oils and low-density solids rise to the surface and heavier particles undergo sedimentation, forming sludge at the bottom of the tank.

Line 10 begins with an input pipe 12 that carries primary sludge and wastewater, which may be termed pipe contents 14, from the primary clarification process into a fermenting tank 18. Flow rate of pipe contents 14 through pipe 12 is adjusted to ensure optimum clarification in the primary clarifier.

The clarified liquid fraction of pipe contents 14 introduced into fermenting tank 18 overflow into a pipe 22, but the heavier, or more viscous elements settle into tank 18 and may be termed tank contents 16. Tank contents 16 settle and stratify in tank 18 and are moved slowly downward by the continual (either continuous or occasional) action of a sludge pump 17. In one preferred embodiment the speed of the sludge pump 17 is proportional to the rate of overflow into pipe 22. This proportionality is set to achieve and maintain a set of sludge residence times (SRT) of the contents of tank 18 (see next paragraph).

Tank contents 16 become stratified according to density and how long they have been in the tank, which shall be referred to as the 'sludge residence time' SRT. Sludge residence time is controlled by the action of sludge pump 17. As the fermentation process occurs at a generally uniform rate throughout the liquid contents of tank 18, tank contents 16 are fermented to a degree generally proportional to their sludge residence time. The bottom portion of settled tank contents 16 form a stratified sludge 19. No forced mixing occurs in fermenting tank 18.

After a specified sludge residence time, sludge 19 reaches a specified concentration of volatile fatty acids that is optimal for the efficiency of the particular plant's biological nutrient removal process.

During fermentation, the first phase of anaerobic degradation, bacteria break down the organic solids and organic acids, primarily volatile fatty acids, are released as one of the byproducts. Volatile fatty acids are desired because they are the preferred energy source for the microorganisms that are responsible for the removal of phosphorous during the enhanced biological nutrient removal process or as the carbon source for the conversion of nitrate and/or nitrite to nitrogen gas in de-nitrification.

The lower layers of sludge 19 have been allowed to ferment the longest and should therefore contain the greatest concentration of VFAs. In one preferred embodiment, sludge pump 17 is controlled so that, when it is pumped out, sludge 19 has been allowed to stratify for 1–5 days and has sufficiently attained the desired concentration of VFAs, which is approximately 3,000 mg/L.

Anaerobic degradation is composed of hydrolysis, acetogenesis and methanogenesis. It is only during hydrolysis and acetogenesis that VFAs are produced. If allowed to continue into methanogenesis, methane gas is produced and VFAs are consumed so controlling the SRT is important.

Controlling the rate at which tank contents 16 are pumped through tank 18 allows for control of the degree to which tank contents 16 are fermented, thereby controlling the degree to which acetogenesis occurs. It is pertinent that the VFAs are harvested before the production of methane gas begins, which can cause problems in the fermentation process and by generating methane bubbles that rise and destratify the sludge 19. Released methane may eventually lead to an explosion.

Sludge 19 is moved through tank 18 by the action of pump 17 and upon removal from tank 18 is carried through pipe 20. Pipe 22 carries overflow 21 from tank 18 by the action of pump 23 to pipe 20 where it is combined with sludge 19. Pipe 20 then carries the combined overflow 21 and sludge 19 to tank 24, where it is exposed to anaerobic conditions. In an alternative preferred embodiment, pipe 22 may also carry water from an alternative source. Since overflow 21 is coming from the top of tank 18, it is composed of the lighter elements of the mixture, and is therefore primarily water. In this example, overflow 21 has an approximate concentration of 270 mg/L of VFAs.

Combining sludge 19 with overflow 21 causes the high concentrations of volatile fatty acid byproducts to be elutriated from sludge 19. Elutriation also conditions the sludge to improve settling by stripping off gas bubbles, removing precursors for methane formation and rinsing out low-density fine particles. Again due to gravity and occurring in a specified amount of time, the heavier organic solids settle to the bottom of tank 24 leaving the volatile fatty acids in the top of the tank as a component of the lighter mixture, forming supernatant 25. As with tank 18, no forced mixing occurs in this step.

The volatile fatty acid rich supernatant 25 is carried through pipe 26 by the action of pump 30 and/or gravity to be used in the biological phosphorous (or nitrogen) removal process (not shown). Supernatant 25 has an approximate concentration of 400 mg/L of VFAs.

The settled organic mixture 29 is continually removed from tank 24 by the action of pump 27 and carried through pipe 28. The pumping rate is set to optimize the thickening of the sludge independently of the production of VFAs. At this point settled organic mixture 29 can either be sent to a solids handling facility, or it can be used again in further fermentation-elutriation processes. Mixture 29, however, will not be returned to the primary clarifier or fermenter to be combined with raw or primary wastewater as in an 'activated' fermenter.

Combining mixture 29 with raw sewage, thereby subjecting it to further 'activated' fermentation, may cause the sludge to become so viscous that it cannot be transported through the plant's pipe systems. Limiting the usage of previously fermented sludge increases the efficiency of the wastewater treatment plant's waste removal process.

The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for treating wastewater that generates a supernatant having a concentration of volatile fatty acids (VFAs) that fall within a specified range and a sludge that has specified percent total solids independent of VFA production, said method comprising the steps of:

(a) providing a fermentation tank and a gravity thickener, operatively connected to said fermentation tank;

(b) permitting primary sludge to flow continually or intermittently into said fermentation tank and permitting a portion of said wastewater to overflow said tank, thereby defining an overflow rate;

(c) subjecting said fermentation tank to anaerobic conditions;

(d) allowing said wastewater in said tank to stratify so that a sludge forms at the bottom of said tank;

(e) continually pumping said sludge from the bottom of said fermentation tank so that each stratification level within said fermentation tank corresponds to a sludge residence time that in turn corresponds to a range of VFA concentrations;

(f) combining overflow liquids from said fermentation tan with said sludge from said fermentation tank in said gravity thickener, permitting VFAs to be separated from said sludge and mixed into said overflow to form a supernatant rich in VFAs; and (g) setting the rate of said pumping of said sludge from said bottom of said fermentation tank to a proportion of said overflow rate, said proportion being set such that said supernatant has a concentration of VFAs that falls within said range of concentrations and so that said sludge has said percent total solids.

2. The method of claim 1 wherein said supernatant is then used in the biological nutrient removal process for removal of phosphorous or nitrogen compounds.

3. The method of claim 1 wherein said gravity thickener comprises an elutriation tank and wherein said volatile fatty acids are separated from said sludge by elutriation.

4. The method of claim 3 wherein a residual sludge is left over in said elutriation tank and wherein said residual sludge is treated y further fermentation and elutriation.

* * * * *

UNITED STATES PATENT AND TRADEMARK OFFICE
CERTIFICATE OF CORRECTION

PATENT NO. : 6,387,264 B1
DATED : May 14, 2002
INVENTOR(S) : Robert James Baur

It is certified that error appears in the above-identified patent and that said Letters Patent is hereby corrected as shown below:

<u>Column 6,</u>
Line 4, change "fall" to -- falls --.
Line 24, change "tan" to -- tank --.
Line 43, change "y" to -- by --.

Signed and Sealed this

Ninth Day of July, 2002

Attest:

Attesting Officer

JAMES E. ROGAN
*Director of the United States Patent and Trademark Office*